United States Patent [19]

Selley

[11] 4,041,104
[45] Aug. 9, 1977

[54] HIGH IMPACT CORROSION RESISTANT POLYMERS

[75] Inventor: Jeffrey E. Selley, East Amherst, N.Y.

[73] Assignee: Hooker Chemicals & Plastics Corporation, Niagara Falls, N.Y.

[21] Appl. No.: 608,931

[22] Filed: Aug. 29, 1975

[51] Int. Cl.² .............................................. C08L 75/00
[52] U.S. Cl. ............................ 260/859 R; 260/37 N; 260/42.18
[58] Field of Search ........................... 260/859, 859 R

[56] References Cited

U.S. PATENT DOCUMENTS

| 3,509,234 | 4/1970 | Burlant et al. | 260/859 R |
| 3,677,920 | 7/1972 | Kai et al. | 260/859 R |
| 3,678,014 | 7/1972 | Suzuki | 260/859 R |
| 3,772,404 | 11/1973 | Knight | 260/859 R |
| 3,855,379 | 12/1974 | Araki | 260/859 R |

Primary Examiner—Paul Lieberman
Attorney, Agent, or Firm—Peter F. Casella; James F. Mudd; William G. Gosz

[57] ABSTRACT

Impact resistant, corrosion resistant polymers are prepared from a polymerizble composition comprising (1) a vinyl monomer and (2) a prepolymer blend obtained by reacting a molar excess of organic diisocyanate with an hydroxyl terminated polydiene and subsequently reacting the product thereof with an hydroxyalkyl acrylate.

13 Claims, No Drawings

4,041,104

HIGH IMPACT CORROSION RESISTANT POLYMERS

BACKGROUND OF THE INVENTION

This invention relates to polymeric materials characterized by a high degree of resiliency, impact strength and corrosion resistance and well suited for use as a material of construction for chemical process equipment. The special corrosion problems encountered in the chemical process industry, the need for handling a variety of corrosive fumes, vapors, gases, and liquids, has led to the need for improved materials of construction. A variety of corrosion-resistant polymeric materials suitable for the construction of ducts, pipe, hoods, stacks, processing tanks, storage tanks, and other such chemical processing equipment, have been developed and used. Although corrosion resistance is a major consideration in the selection of such materials, other factors such as cost, availability, ease of fabrication, mechanical strength, and resistance to impact must be considered. Resins selected on the basis of corrosion resistance for the fabrication of chemical process equipment are frequently deficient in one or more of these other important factors, especially in mechanical properties such a resiliency and impact strength. The rate of failure of prior art materials through impact or vibration has been a major problem. Thus, for example, polyester resins such as those derived from bisphenol-A and fumaric acid are noted for exceptional hydrolytic and heat stability and have been used extensively in the manufacture of equipment which will withstand strong acids and bases. However, such resins, even when reinforced with glass fiber and the like are brittle and tend to fracture readily on impact or flexure. Attempts to flexibilize such materials, for example, by incorporation of polyether glycols into the resin, frequently leads to a deterioration of the corrosion resistance of the resin. Attempts to provide resins having improved impact strength has led to the development of the vinyl esters, the reaction products of diepoxides and methacrylic acid. Although these vinyl esters offer improved resilience, they still tend to crack or fracture to some degree when impacted. The cracks produced by impact often lead to a pronounced chemical attack resulting in part from a wicking action at the damaged impact site, leading to equipment failure. Other polymers have been developed wherein the introduction of urethane linkages in the polymer structure results in improvements in corrosion resistance. It is known, for example, that corrosion resistant polymers may be prepared from monomers characterized by the presence of urethane linkages and ethylenically unsaturated terminal groups. U.S. Pat. No. 3,297,745 discloses the preparation of such monomers by the reaction of one mole of a glycol such as an alkylene, arylene, or polyalkylene ether glycol, with two moles of a diisocyanate to form a diisocyanate having two urethane linkages and subsequent reaction of one mole of the diurethane diisocyanate with two moles of an ethylenically unsaturated alcohol such as an hydroxyalkylacrylate. The resultant acrylate terminated tetraurethane monomer may be polymerized or copolymerized to form corrosion-resistant polymers or copolymers. However, the polymers thus prepared, especially those prepared by curing the acrylate terminated tetraurethane monomer by copolymerization with styrene or similar vinyl monomers are rigid, brittle materials. It will be appreciated by those skilled in the art that a continuing need exists for the development corrosion-resistant materials having improved resistance to mechanical stress, shock and vibration.

Accordingly, it is an object of this invention to provide novel polymeric materials and articles manufactured therefrom having a high impact strength as well as excellent corrosion-resistant properties. It is a further object to provide a novel prepolymer composition, which may be polymerized to form a polymer suitable for the fabrication of chemical processing equipment, having a degree of impact resistance and corrosion-resistance. Additional objects and advantages of the present invention will become apparent to those skilled in the art from the following description.

SUMMARY OF THE INVENTION

It has been found that polymeric compositions having excellent impact resistant and corrosion-resistant properties may be prepared from prepolymer compositions comprising (A) a vinyl monomer and (B) a prepolymer blend obtained by reacting a molar excess of a diisocyanate with an hydroxyl-terminated 1,4-polydiene and subsequently reacting the product thereof with an hydroxyalkyl acetate. The prepolymer composition may be polymerized to form an impact resistant, corrosion resistant, thermoset polymer well suited for use in the preparation of castings, moldings, reinforced laminates and the like.

The novel polymers of this invention may be conveniently fabricated into various shapes or articles using conventional techniques, such as hand lay-up methods, molding, centrifugal casting and the like with or without additional reinforcing agents, such as metal, glass cloth, mat, or fiber, asbestos fibers and the like. Thus in one aspect the present invention relates to novel prepolymer compositions and in a second aspect to thermoset polymers and articles of manufacture such as castings, moldings, reinforced laminates and the like prepared from these novel prepolymer compositions.

PREPARATION OF THE PREPOLYMER

The prepolymer blend may be prepared by first reacting an hydroxyl terminated 1,4-polydiene with a molar excess of a diisocyanate and subsequently reacting the product thereof with an hydroxyalkyl acrylate. The reaction steps are advantageously carried out in the presence of a solvent. To obtain the desired mechanical and corrosion resistant properties in the final polymeric product, it is preferred to employ the reactants in a molar proportion of about 0.01 to about 0.2 and most preferably about 0.03 to about 0.15 moles of polydiene per mole of diisocyanate. The reaction product thus obtained from the first reaction step, is an isocyanate terminated diurethane polydiene in admixture with excess diisocyanate. In the subsequent reaction, the hydroxyalkyl acrylate is advantageously employed in a molar ratio of about 1.5 to about 2.0 moles per mole of dissocyanate starting material. The reaction product thus obtained is a prepolymer blend of a minor molar proportion of an acrylate terminated tetraurethane polydiene and a major molar proportion of an acrylate terminated diurethane derived from the starting diisocyanate. The prepolymer blend thus prepared may be homopolymerized or preferably copolymerized with vinyl monomer.

Suitable hydroxyl-terminated linear 1,4-polydienes which may be employed in the preparation of the prepolymer are those polydienes (or copolymers) resulting from predominantly 1,4-addition polzmerization. A minor amount of 1,2- addition product, wherein the unsaturation is present as pendent vinyl groups, may be present but is of no advantage. Suitable hydroxyl-terminated 1,4-polydienes include, for example, hydroxyl terminated polymers or copolymers prepared by polymerization of one or more conjugated dienes preferably conjugated dienes characterized by a carbon chain of from 4 to about 8 carbon atoms such as the linear dienes 1,3-butadiene, 2-chloro-1,3-butadiene, 1,3-pentadiene, isoprene, and the like or copolymerization of one or more these dienes with up to about 40 mole percent of one or more vinyl monomers such as styrenes, acrylates, methacrylates, acrylonitrile, isobutylene and the like and wherein the unsaturation present in the polymer chain is predominently of the 1,4 type unsaturation, that is unsaturation resulting from 1,4 addition polymerization. The preferred hydroxyl-terminated polydienes are those homopolymers of 1,3-butadiene and copolymers of 1,3-butadiene and acrylonitrile and wherein greater than 60% and preferably greater than 75% of the unsaturation present in the polymer chain is of the 1,4 type unsaturation (and less than 40% preferably less than 25 percent of 1,2 type unsaturation.) Where greater amounts of 1,2 type unsaturation, that is, unsaturation resulting from 1,2-addition is present the advantageous resiliency and impact resistance of the final polymer is diminished. The hydroxyl-terminated polydienes which are copolymers of butadiene and acrylonitrile are preferably those prepared from about 10 to about 25 mole percent acrylonitrile and from about 90 to about 75 mole percent butadiene. The hydroxyl-terminated polydienes (or copolymer) employed may vary considerably in molecular weight, but are preferably those having a molecular weight of about 500 to about 10,000 and most perferably about 750 to about 4,000. The 1,4-polydienes or copolymers of 1,3-dienes and an unsaturated monomer are commonly prepared by known methods for example by the free radical initiated polymerization of a diene monomer. Terminal hydroxyl groups may be introduced onto the polydiene by known methods, for example, by the addition of a compound such as ethylene oxide which is capable of forming hydroxyl groups during polymerization.

Suitable diisocyanates which may be reacted with the hydroxyl-terminated polydiene to form an isocyanate-terminated diurethane polydiene intermediate include a wide variety of aromatic, aliphatic, and cycloaliphatic diisocyanates. Based on availability and cost as well as the properties of the final polymer, the preferred diisocyanate is 4,4'-methylene-bis(phenylisocyanate). Other diisocyanates which may be employed include for example, 2,4-toluene diisocyanate, 2,6-toluene diisocyanate, 1,5-naphthalene diisocyanate, hexamethylene diisocyanate, pentamethylene diisocyanate, cyclohexyl-2,4-diisocyanate 4,4'-methylene bis(cyclohexyl diisocyanate), and the like or mixtures thereof.

A wide variety of hyroxylalkyl acrylates or methacrylates may be employed to provide terminal acrylate groups on the prepolymer components. The term "hyroxyalkyl acrylate" is employed in this specification and claims in a generic sense to include hydroxyalkyl acrylates as well as hydroxyalkyl methacrylates. Where reference is made to a specific compound of this type the appropriate species name — acrylate or methacrylate — is employed. Suitable acrylates include, for example, 2-hydroxyethyl acrylate, 2-hyroxyethyl methacrylate, 2-hyroxyl-1-methylethyl acrylate, 2hydroxy-1-methylethyl methacrylate, 2-hydroxypropyl acrylate, 2-hydroxypropyl methacrylate, 3-hydroxypropyl acrylate, 3-hydroxypropyl methacrylate, 2-hydroxybutyl acrylate, 2hydroxybutyl methacrylate, 2hydroxyoctyl acrylate, 2-hydroxyoctyl methacrylate, 2hydroxydodecenyl acrylate, 2hydroxydodecenyl methacrylate, 2hydroxy-3-chloropropyl acrylate, 2-hydroxy-3-chloropropyl methacrylate and the like as well as mixtures of these. The preferred hydroxyalkyl acrylates or methacrylates are those wherein the alkyl group is 1 to 4 carbon atoms and most preferably hydroxypropyl methacrylate.

The preparation of the prepolymer blend may be carried out in the presence of a suitable inlet solvent such as benzene, toluene, xylene and the like. It is preferred, however, to employ as the solvent, an ethylenically unsaturated monomer, such as styrene or methyl methacrylate, which may additionally serve as a copolymerizable monomer in subsequent reaction with the prepolymer blend.

In the preparation of the prepolymer blend, both the first reaction, that is, the hydroxy polydiene-diisocyanate reaction and the subsequent reaction with an hydroxyalkyl acrylate may be carried out over a wide range of temperatures, for example, from about room temperature (such as 25° Celsius) or below to about 200° Celsius or higher. Preferably the reactions are carried out at a temperature of about 35° to about 100° Celsius. Both reactions are slightly exothermic.

The preparation of the prepolymer blend as well as the subsequent polymerization or copolymerization thereof are preferably carried out at atmospheric pressure. However, subatmospheric or superatmospheric pressures may be employed, if desired.

In the preparation of the thermoset polymers and articles of manufacture of this invention, the prepolymer blend is admixed with a vinyl monomer to form a polymerizable composition. The vinyl monomers with which the prepolymer blend may be copolymerized include a wide variety of polymerizable monomers containing the reactive group $H_2C=C<$. Specific examples include styrene, chlorostyrenes, methylstyrenes, divinylbenzenes, methylacrylate, methyl-methacrylate, ethyl acrylate, n-butyl acrylate, 2-ethylhexyl acrylate, 1,3-butylene dimethyacrylate, ethylene glycol diacrylate, ethylene glycol dimethacrylate, and the like as well as mixtures thereof. The preferred monomers are styrene and methyl methacrylate. The proportion of unsaturated monomer and prepolymer blend may vary considerably but is preferably in the range of about 30 to 50 weight percent of monomer and about 50 to 70 weight percent of prepolymer blend. The vinyl monomer may be added in the appropriate proportions to the prepolymer blend to form a polymerizable composition. Alternatively, all or a portion of the monomer may be added to the reaction mixture during the preparation of the prepolymer blend to serve as solvent for the reaction. When the vinyl monomer is added as a solvent for the preparation of the prepolymer blend it is preferred to add a stabilizer or polymerization inhibitor, to the reaction mixture, to prevent premature polymerization. Furthermore, the addition of a polymerization inhibitor permits the storage and or shipping of the polymerizable prepolymer composition. Polymerization inhibitors are generally added in amounts in the order of about 0.001 to 1.0 weight percent of the mixture. Among the inhibitors which may be advantageously employed to prevent the premature polymerization of the polymer blend and vinyl monomer, are substances such as hydroquinone, toluhydroquinone, benzoquinone, paratertiarybutyl catechol, para-phenylene diamine, trinitrobenzene, picric acid and the like.

The polymerizable composition, comprising the vinyl monomer and prepolymer blend is readily polymerized in the presence of a suitable catalyst such as a free radical catalyst. Typical catalysts that may be employed for this purpose include benzoyl peroxide, tertiary butyl peroxide, acetyl peroxide, tertiary butyl perbenzoate, cumene hydroperoxide, tertiary butyl hydroperoxide, dicumyl peroxide and the like. Such catalysts are typically used in proportions of about 0.01 to about 10 percent of the total composition, depending on the efficiency of their action and whether or not substances which inhibit polymerization are present in the mixture. The polymerization reaction can also be hastened by the addition of a suitable promotor such as dimethyl aniline usually in proportions similar to or smaller than the amount of catalyst employed.

It is to be understood that fillers, dyes, pigments, lubricants, fire retardants, and various other adjuvants and modifying agents may be incorporated in the compositions of this invertion in order to obtain or accentuate any given property. Furthermore molding and laminates may be prepared by the addition of a suitable reinforcing agent such as glass rovings, glass mat, asbestos fiber, mica and the like.

The following specific examples are provided to further illustrate this invention and the manner in which it may be carried out. It will be understood that the specific details given in the examples have been chosen for purpose of illustration and are not to be construed as a limitation on the invention. In the examples, as well as elsewhere in the specification and claims unless otherwise indicated, all parts and percentages are by weight and all temperatures are in degrees Celsius.

EXAMPLE 1

Two hundred eighty-six parts of 4,4'-methylenebis (phenylisocyanate) was charged to a reaction vessel and heated to 70° C with agitation. A mixture of 200 parts of styrene and 200 parts of hydroxyl-terminated polybutadiene (about 80 percent 1,4 and 20 percent 1,2 type unsaturation M.W.=about 2667) was added and mixed therewith over a period of about 30 minutes. The temperature of the reaction mixture was maintained at about 70° for an additional 15 minute period following which 250 parts of hydroxypropyl methacrylate, containing 0.2 parts of benzoquinone was added and mixed therewith over a 15 minute period. The reaction mixture was held at 70°–75° C for two hours to permit completion of the reaction. An additional 200 parts of styrene was added and mixed therewith and the result prepolymer composition was cooled to room temperature (about 25° C).

A portion of the prepolymer composition was catalyzed by mixing 200 parts thereof with 2.0 parts of catalyst paste (50% benzoyl peroxide) and 0.2 parts of dimethyl aniline accelerator.

One-eighth inch thick castings were prepared by pouring the catalyzed composition into a mold. The catalyzed composition, was allowed to cure at ambient conditions for 3-4 hours, then post-cured at 100° C for 2 hours.

Laminates were prepared from the catalyzed prepolymer resin reinforced with two ply of c-type glass veil and two ply of glass mat by building up alternate layers of resin and glass fiber reinforcement, the outer layers of glass fiber being in the form of 2 ounce E type chopped strand glass mat. Each layer of glass fiber was pressed into the preceeding layer of resin to insure complete coating of the glass fiber with resin. A final layer of resin was applied and the structure was pressed to a ⅛ inch thickness. The resultant laminate was cured at ambient temperature for 3-4 hours and post-cured at 100° C for 2 hours.

The castings and laminates were tested for mechanical and corrosion resistant properties with the results shown in Table 1, below.

EXAMPLES 2–7

One-hundred seventy-four parts of toluene diisocyanate (a mixture of about 80 percent 2,4- and 20 percent 2,6- isomers) was charged to a reaction vessel and heated to 70° C. A mixture of 200 parts of styrene and 200 parts of an hydroxyl-terminated copolymer or acrylonitrile and 1,3-butadiene (85 mole percent butadiene; butadiene structure about 80% 1,4 and 20% 1,2 type unsaturation; M.W.=about 3333) was added and mixed with the diisocyanate over a 30 minute period. The reaction temperature was maintained at about 70° C for an additional 30 minutes, following which 250 parts of hydroxypropyl methacrylate and 0.1 parts of benzoquinone were added over a 15 minute period. The reaction mixture was held at 70°–80° C for an additional two hours, then cooled to room temperature (about 25° C).

A catalyzed composition was prepared by mixing 200 parts of the prepolymer with 2.0 parts of catalyst parts (50% benzyl peroxide) and 0.2 parts of dimethyl aniline.

Castings and laminates were prepared as described in Example 1 and tested for mechanical and corrosion properties with the results shown in Table 1, below.

The series of prepolymer compositions were prepared and formed as castings and laminates, following the procedure of Examples 1 and 2, except that the reactants and amounts were varied as shown in Table 1, below. In each example, the polydiene component contained about 80% 1,4- and about 20% 1,2-type unsaturation. The castings and laminates were tested for mechanical properties and corrosion resistance with the results as shown.

EXAMPLES 8C and 9C

For purposes of comparison, the properties of two commercially available resins, commonly used for the fabrication of chemical process equipment, were tested with the results as shown in Examples 8C and 9C. Thus, Example 8C is a commercially available propoxylated Bisphenol-A fumarate resin and Example 9C is an epoxy vinyl ester resin.

TABLE 1

| COMPOSITION (Parts) | 1 | 2 | 3 | 4 | 5 | 6 | 7 | 8C | 9C |
|---|---|---|---|---|---|---|---|---|---|
| Toluene Diisocyanate | 286 | | | | | | 286 | | |
| 4,4-Methylenebis(phenylisocyanate) | 200 | 174 | 174 | 174 | 286 | 286 | 150 | (propoxylated Bisphenol-A fumarate resin) | (Epoxy Vinyl ester resin) |
| Hydroxy-terminated Polybutadiene (MW=about 2667) | | | | | | | | | |
| Hydroxyl-terminated Butadiene-acrylonitrile copolymer (MW=about 3333) | | | | | | | | | |
| Hydroxypropyl methacrylate | 250 | 200 | 350 | 500 | 200 | 350 | 260 | | |
| Styrene | 400 | 250 | 220 | 200 | 250 | 220 | 300 | | |
| Benzoquinone | 0.2 | 350 | 350 | 500 | 600 | 400 | 0.1* | | |
| Benzoyl peroxide paste (50% benzoyl peroxide)* | 2 | 0.15 | 0.15 | 0.2 | 0.3 | 0.2 | 4.0 | | |
| Dimethyl Aniline* | 0.2 | 4.0 | 4.0 | 4.0 | 4.0 | 4.0 | 0.4 | | |
| | | 0.4 | 0.4 | 0.4 | 0.4 | 0.4 | | | |

*per 200 parts of prepolymer

| Mechanical Properties | Test Method | 1 | 2 | 3 | 4 | 5 | 6 | 7 | 8C | 9C |
|---|---|---|---|---|---|---|---|---|---|---|
| Castings | | | | | | | | | | |
| HDT ° C at 264 psi | ASTM-D-648 | 85° | 105° | 60° | 45° | 92° | 70° | | 130° | 85° |
| Tensile Strength (psi) | ASTM-D-638 | 5000 | 6600° | 2300 | 1600 | 4300 | 4600 | 5360 | 6000 | 9000 |
| Tensile Modulus (psi) | ASTM-D-638 | 2.4×10⁵ | 3.2×10⁵ | 8.5×10⁴ | 5.6×10⁴ | 2.2×10⁵ | 2.0×10⁵ | | 4.4×10⁵ | 4.0×10⁵ |
| Percent Elongation (%) | ASTM-D-638 | 4.0 | 4.3 | 14.5 | 17.6 | 4.6 | 8.4 | 2.37 | 1.0 | 3.5 |
| Laminates | | | | | | | | | | |
| Flexural Strength (psi)-initial | ASTM-D-790 | 21,100 | 20,400 | 17,700 | 16,800 | 21,200 | 19,000 | 20,000 | 17,600 | 17,200 |
| Flexural Modulus (psi)-initial | ASTM-D-790 | 6.2×10⁵ | 6.5×10⁵ | 3.6×10⁵ | 5.0×10⁵ | 6.8×10⁵ | 4.2×10⁵ | 8.7×10⁵ | 8.1×10⁵ | 8.4×10⁵ |
| Flexural Strength (psi)-after 30 days at 70° C in the following environment | ASTM-D-790 | | | | | | | | | |
| 10% aq. NaOH | | 19,516 | 15,781 | 15,244 | 16,031 | 24,124 | 21,080 | | 16,129 | 16,103 |
| H₂O | | 16,113 | 15,008 | 13,561 | 19,906 | 15,403 | | 19,672 | 18,507 | |
| 10% aq. HCl | | 20,598 | 17,905 | 16,415 | 14,346 | 23,810 | 19,281 | | 20,432 | 20,670 |
| Direct Impact Damage (inches)** | | 0.5 | None | None | 0.38 | 0.25 | 0.25 | 1.75 | 1.0 | |
| | | 18,370 | | | | | | | | |
| | | 0.5 | | | | | | | | |

*Damage determined by dropping a 1 lb. steel ball 36 inches onto laminate and measuring damage area diameter in inches.

From the data of Table 1, it will be seen that the polymer compositions of the present invention exhibit excellent corrosion resistance over a wide pH range and are closely comparable in that respect to commercially available compositions while providing a substantial improvement in elongation and impact resistance. With regard to mechanical properties, the tensile and elongation characteristics indicate a high resilience and distensibility while in turn results in a lessening of the damage occurring at a given impact site. Furthermore, corrosion attack which commonly results from a wicking action at an impact site is proportionally lessened.

The foregoing specification is intended to illustrate the invention with certain preferred embodiments, but it is understood that the details disclosed herein can be modified without departing from the spirit and scope of the invention.

I claim:

1. A polymerizable composition comprising (A) a vinyl monomer, present in an amount of about 30 to 50 weight percent; and (B) a prepolymer blend, present in an amount of about 50 to 70 weight percent, obtained by the steps of (a) reacting an organic dissocyanate and a hydroxyl-terminated polydiene in a molar ratio of about 0.01 to about 0.2 moles of polydiene per mole of diisocyanate, wherein greater than 75% of the unsaturation present in said polydiene is of the 1,4-type and less than 25% of the unsaturation present is of the 1,2-type, ane (b) reacting the product of step (a) with a hydroxyalkyl acrylate in a molar ratio of about 1.5 to about 2.0 moles per mole of said diisocyanate.

2. A polymerizable composition according to claim 1 wherein the hydroxyl-terminated polydiene is selected from the group consisting of homopolymers of 1,3-butadiene and copolymers of 1,3-butadiene and up to about 25 mole percent of acylonitrile.

3. A polymerizable composition according to claim 2 wherein the vinyl monomer is styrene.

4. A polymerizable composition according to claim 3 wherein the hydroxyalkyl acrylate is characterized by an alkyl group of from 1 to 4 carbon atoms.

5. A polymerizable composition according to claim 4 wherin the isocyanate is selected from the group consisting of toluene diisocyanate and 4,4-methylene-bis (phenylisocyanate).

6. A polymerizable composition according to claim 5 wherein the hydroxyl-terminated polydiene is an hydroxyl-terminated polybutadiene in which at least about 75 percent of the unsaturation present is of the 1,4- form of unsaturation.

7. A polymerizable composition according to claim 2 wherein the diisocyanate is toluene diisocyanate.

8. A polymerizable composition according to claim 7 wherein the hydroxyalkyl acrylate is hydroxypropyl methyacrylate.

9. A polymerizable composition according to claim 5 wherein the hydroxyl-terminated polydiene is a copolymer of 1,3-butadiene and up to about 25 mole percent of acrylonitrile, in which at least about 75 percent of the unsaturation present is of the 1,4-form of unsaturation.

10. A polymerizable composition according to claim 9 wherein the diisocyanate is methylene-bis(phenylisocyanate).

11. A polymerizable composition according to claim 10 wherein the hydroxyalkyl acrylate is hydroxypropyl methacrylate.

12. The composition according to claim 5 when polymerized to an infusible product.

13. A laminated article comprising the polymerized product of claim 4 admixed with a reinforcing agent.

* * * * *